(12) United States Patent
Wierzchon et al.

(10) Patent No.: US 10,556,311 B2
(45) Date of Patent: Feb. 11, 2020

(54) LOCK DEVICE FOR POWER TOOL ADJUSTMENT

(71) Applicant: Robert Bosch GmbH, Stuttgart (DE)

(72) Inventors: Peter Jack Wierzchon, Morton Grove, IL (US); Craig Thomas Barrett, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 286 days.

(21) Appl. No.: 15/478,411

(22) Filed: Apr. 4, 2017

(65) Prior Publication Data
US 2018/0281135 A1    Oct. 4, 2018

(51) Int. Cl.
*B25B 3/00*  (2006.01)
*B23Q 9/00*  (2006.01)
*B27C 5/10*  (2006.01)
*B23Q 16/00* (2006.01)
*B25F 5/00*  (2006.01)

(52) U.S. Cl.
CPC ......... *B23Q 9/0028* (2013.01); *B23Q 16/001* (2013.01); *B25F 5/003* (2013.01); *B27C 5/10* (2013.01)

(58) Field of Classification Search
USPC ............. 269/1; 409/182; 144/136.85, 154.5
See application file for complete search history.

(56) References Cited

U.S. PATENT DOCUMENTS

| 4,445,811 | A | 5/1984 | Sanders | |
|---|---|---|---|---|
| 5,671,789 | A * | 9/1997 | Stolzer | B23Q 1/28 144/136.95 |
| 6,986,369 | B1 | 1/2006 | Cooper et al. | |
| 7,290,574 | B2 * | 11/2007 | Baber | B25F 5/021 144/135.2 |
| 7,290,575 | B2 * | 11/2007 | Freese | B27C 5/10 144/136.95 |
| 2003/0002947 | A1 | 1/2003 | Hathcock et al. | |
| 2004/0035495 | A1 | 2/2004 | Hessenberger et al. | |
| 2014/0178142 | A1 | 6/2014 | Tan | |
| 2016/0318204 | A1 * | 11/2016 | Truesdale | B23Q 16/02 |

* cited by examiner

*Primary Examiner* — Joseph J Hail
*Assistant Examiner* — Shantese L McDonald
(74) *Attorney, Agent, or Firm* — Maginot, Moore & Beck LLP

(57) ABSTRACT

A base assembly for a power tool, such as a router, includes a base member, an adjustment mechanism, and a lock member. The base member is configured to accept a motor housing of the power tool. The adjustment mechanism is configured to adjust a position of the motor housing relative to the base member via rotation of a first contact portion of the adjustment mechanism. The lock member is moveable relative to the adjustment mechanism between a first position that prevents rotation of the adjustment mechanism and a second position that permits rotation of the adjustment mechanism. The lock member includes a second contact portion positioned proximate to the first contact portion and configured to be actuated to position the lock member in the second position. The position of the motor housing is adjusted by simultaneously actuating the first contact portion and the second contact portion.

20 Claims, 9 Drawing Sheets

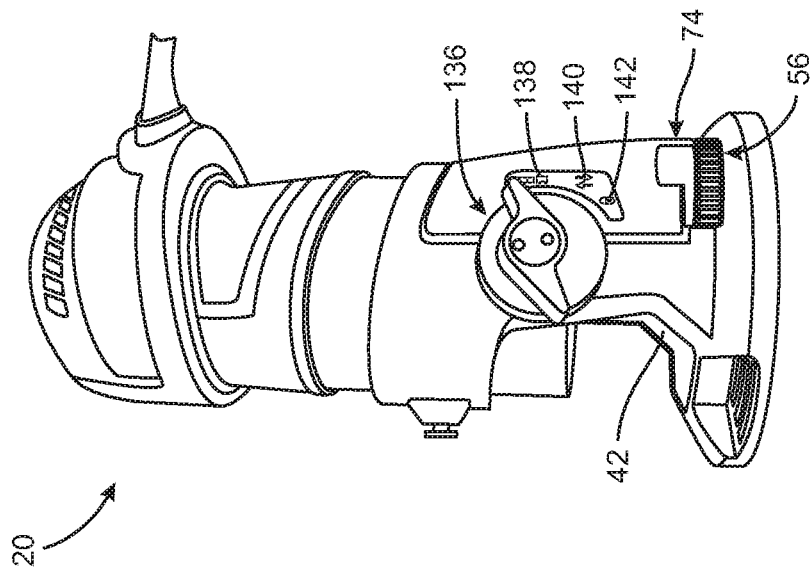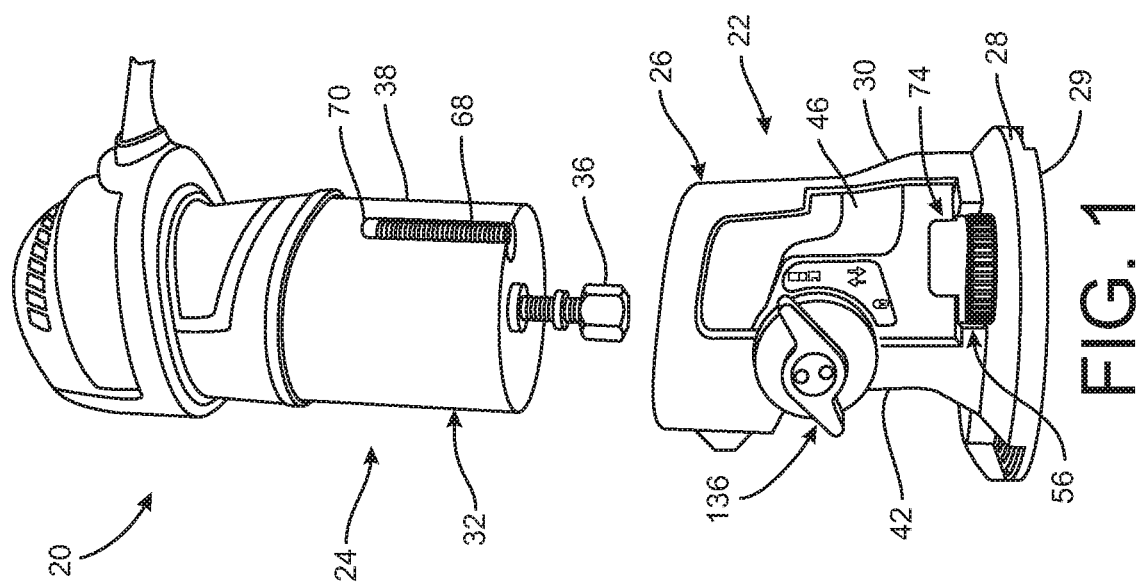

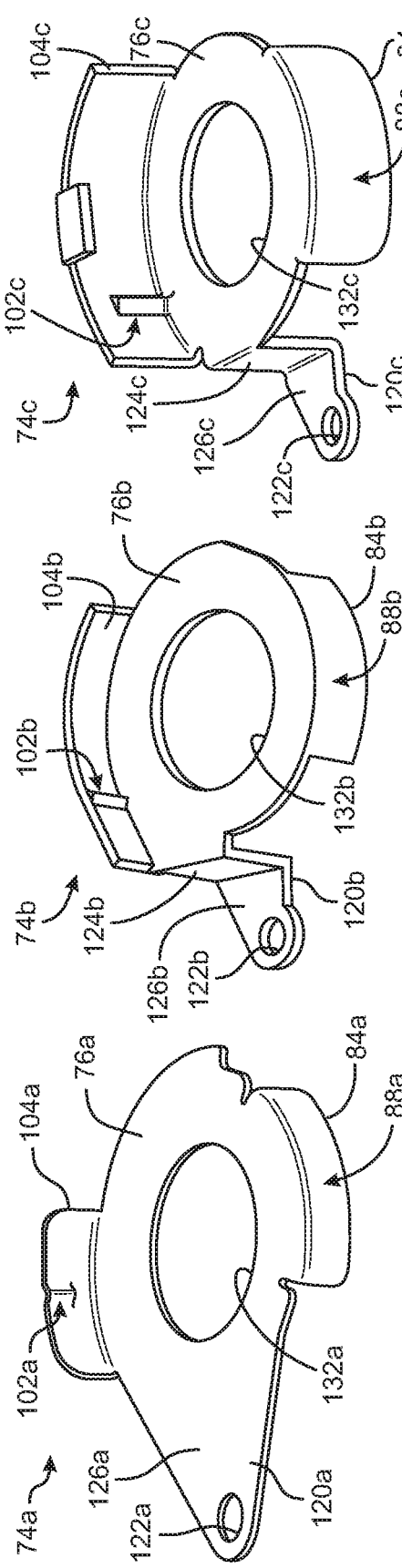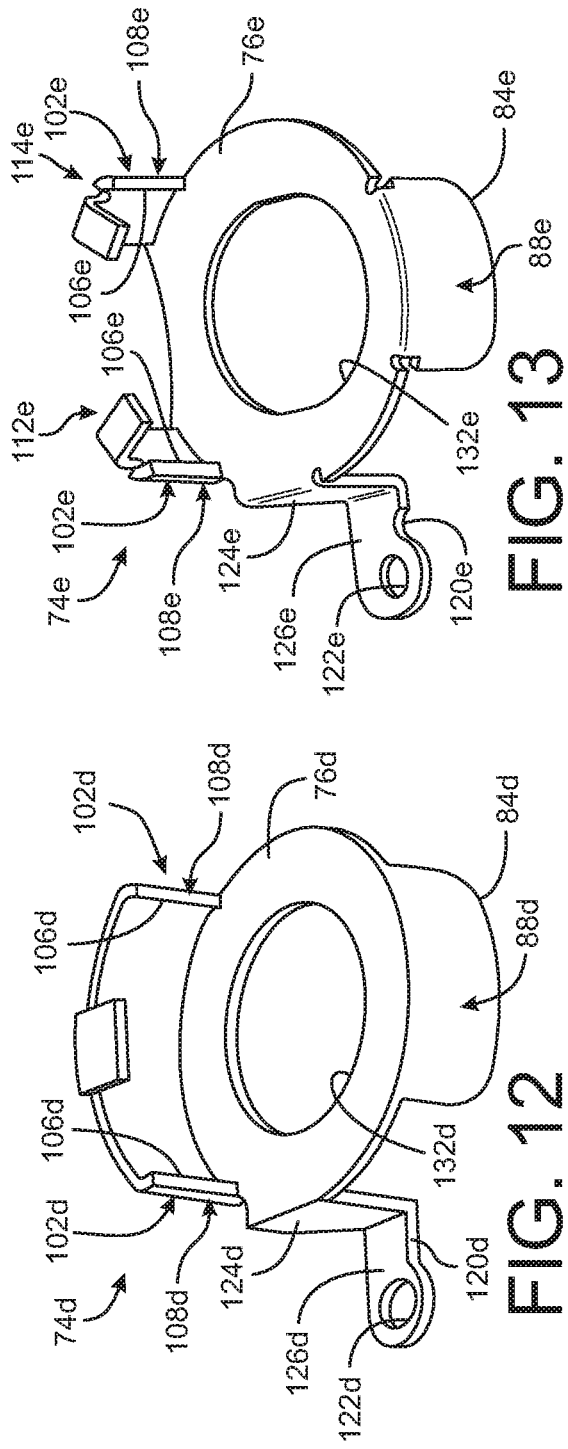

LOCK DEVICE FOR POWER TOOL ADJUSTMENT

TECHNICAL FIELD

The present disclosure relates to power tools and more particularly to power tools with position adjustment.

BACKGROUND

Routers are a type of power tool used to remove material from a workpiece for decorative or functional purposes. In particular, routers may be useful in performing cabinetwork, cutting grooves in the surface or edges of a material, and applying a decorative border to a material through fluting or beading. In general, there are two types of routers, namely fixed base routers and plunge base routers. Both types of routers include an electric motor having a rotating shaft mounted vertically within a housing. The motor shaft terminates with a chuck, clamp, or collet for interchangeably securing a cutting tool, referred to as a router bit, to the shaft for rotation with the shaft. Fixed base routers and plunge base routers exhibit structural differences that affect the method by which a user operates the routers.

Fixed base routers include a motor unit coupled to a base having a motor mount and a work engaging surface. The motor mount is typically connected to the top portion of the base opposite the work engaging surface. Some fixed base routers have two opposing handles associated with the base while other fixed base routers have a grip portion formed as part of the motor unit. These latter routers are sometimes referred to as palm routers. In fixed base routers with handles, the handles are connected to the motor mount and/or the top surface of the work engaging surface. A router bit, coupled to the motor unit, is configured to extend through an opening in the work engaging surface. The amount the router bit extends from the work engaging surface is adjustable depending on the position of the motor unit relative to the motor mount. In particular, the motor mount may include a plurality of different positions in which the motor unit may be locked. The plurality of positions enables a user to make grooves or cuts of a particular depth, depending on which position is selected. In general, a user operates a fixed base router by precisely guiding the rotating router bit around the edges or surface of a workpiece, thereby causing the bit to cut and remove portions of the workpiece at a fixed and predetermined depth.

Plunge base routers include a carriage, two opposing handles, a base plate, and two plunge posts. The plunge posts extend perpendicularly from the base plate and extend into channels formed in the carriage. The carriage is configured to house an electric motor, wherein the rotating shaft of the electric motor extends downward from the carriage toward the base plate. The opposing handles are connected to opposite sides of the carriage. Biasing members are configured to bias the carriage in an upward direction away from the base plate so that the motor shaft and the router bit, if one is attached, are positioned above the base plate, out of contact with a workpiece. A user may apply downward pressure upon the opposing handles, to slide the carriage down the plunge posts toward the workpiece until the router bit extends below the base plate by a predetermined distance. Thus, the term "plunge" refers to the ability of a plunge base router to direct a router bit into contact with a workpiece from the upper position in which the router maintains the rotating router bit above the workpiece, to the lower position in which the router bit is forced into contact with the workpiece. The router may be secured in the lower position with a locking member, thereby permitting a user to relax the downward pressure upon the opposing handles during the routing process. Upon releasing the locking member and the downward pressure on the handles, the biasing system forces the carriage to slide up the plunge posts to the upper position, thereby removing the router bit from contact with the workpiece.

Some routers, referred to as modular or combination routers, are configured to have a motor unit that may be removably connected to the carriage of a plunge base or the motor mount of a fixed base. A user may select the plunge base or the fixed base depending upon the task to be performed with the router. In particular, a fixed base router may be most useful in making cuts or grooves along the outer edges of a workpiece, while a plunge base router may be most useful in making cuts or grooves in the interior surface of a workpiece.

Regardless of the type of router selected, finish carpentry and woodworking are typically time-intensive endeavors. A carpenter or other user wants the reassurance that precise settings, such as depth of cut, are maintained under all operating conditions of the router. A typical wood cutting router may use a screw thread to convert rotational motion, for example from a rotatable dial, to linear motion to position the motor unit relative to the carriage or the motor mount. Once the user rotates the dial to set the desired router position, the user expects that position to be reliably maintained despite vibration during operation of the router or unintentional contact from the user or the work environment.

In view of the foregoing, it would be advantageous to provide a power tool, such as a router, with an unobtrusive lock mechanism that prevents vibration or unintentional contact from changing a set position of the power tool. An ergonomic lock mechanism that provides efficient release of the lock mechanism to allow position adjustment of the power tool would be further advantageous.

SUMMARY

A base assembly for a power tool in one embodiment includes a base member configured to accept a motor housing of the power tool, an adjustment mechanism attached to the base member, the adjustment mechanism configured to adjust a position of the motor housing relative to the base member via rotation of the adjustment mechanism, and a lock member attached to the base member, the lock member moveable relative to the adjustment mechanism between a first position that prevents rotation of the adjustment mechanism and a second position that permits rotation of the adjustment mechanism, the adjustment mechanism includes a first contact portion configured to be actuated to rotate the adjustment mechanism, the lock member includes a second contact portion positioned proximate to the first contact portion and configured to be actuated to position the lock member in the second position, the position of the motor housing adjusted by simultaneous actuation of the first contact portion and the second contact portion by a user.

BRIEF DESCRIPTION OF DRAWINGS

FIG. 1 illustrates a side perspective view of a router with a motor unit and a base assembly in an uncoupled state.

FIG. 2 illustrates the router of FIG. 1 with the motor unit inserted into the base assembly.

FIGS. 9-13 illustrate different embodiments of the lock member.

DESCRIPTION

Figure 3:
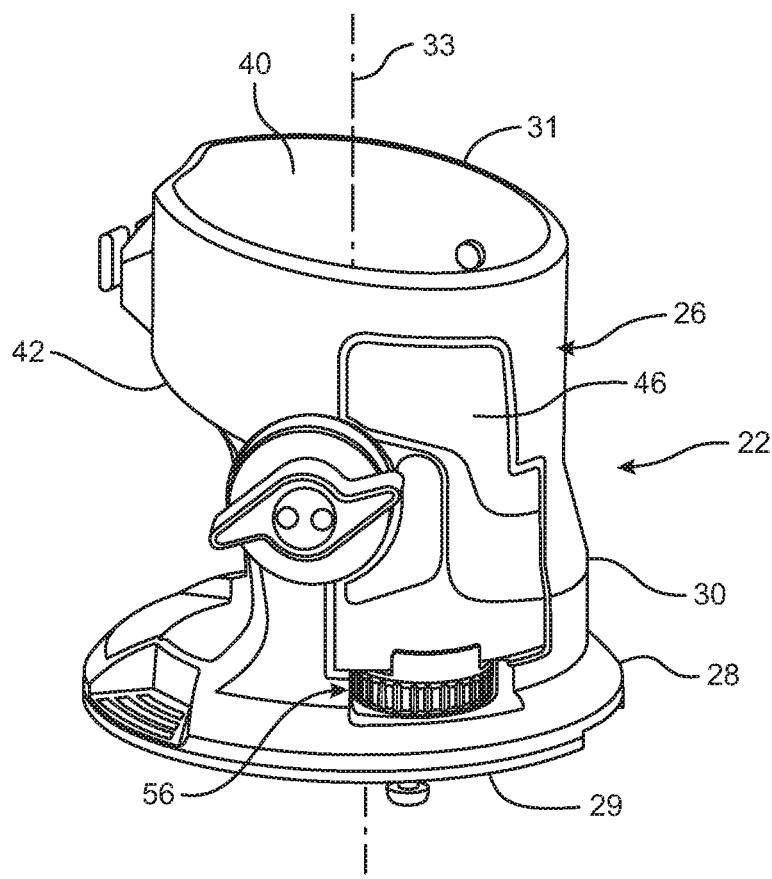
FIG. 3 illustrates a side perspective view of the base assembly of FIG. 1.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

FIGS. 1 and 2 illustrate one embodiment of a power tool 20 in the form of a router. The router 20 includes a base assembly 22 and a motor unit 24 configured to be movably supported by the base assembly 22. FIG. 1 shows the motor unit 24 and the base assembly 22 in an uncoupled condition. FIG. 2 shows the motor unit 24 moveably supported by the base assembly 22 in a partially coupled condition before the motor unit 24 is fixed in a desired position by a user. In the illustrated embodiment, the router 20 is a fixed base router. Alternatively, the router 20 can be configured as a plunge router, or as a modular router configured to be interchangeable with a fixed base and a plunge base.

The base assembly 22 includes a base member 26 that has a base portion 28 configured to interface with a work surface (not shown), such as a surface of a wood block or a wood panel. The base member 26 also has a sleeve portion 30 extending upwardly from the base portion 28. The sleeve portion 30 is an integral feature of the base member 26 and has a generally cylindrical outer surface in the embodiment shown. The sleeve portion in other embodiments can have an outer surface with a different geometry and can be separately fastened to the base portion 28. The sleeve portion 30 defines a central opening 31 (FIG. 3) that extends entirely through the base member 26 and defines a vertical axis 33 (FIG. 3) of the base assembly 22. The base portion 28 in the embodiment shown is flared radially outwardly from the sleeve portion 30 to increase a mounting surface 29 of the base member 26 on the work surface.

The motor unit 24 has a motor housing 32 that supports a motor (not shown) operable to drive a tool element 34 (FIG. 14) secured to a tool holder 36 to cut the work surface. The sleeve portion 30 is configured to accept the motor housing 32 at least partially in the central opening 31 (FIG. 3) so as to moveably support the motor unit 24. In the embodiment shown, the motor housing 32 has a cylindrical outer surface 38 and the sleeve portion 30 has a cylindrical inner surface 40 generally corresponding to the outer surface 38 of motor housing 32. Alternatively, the outer surface 38 of the motor housing 32 and the inner surface 40 of the sleeve portion 30 can have other corresponding geometries.

The base member 26 defines both an observation opening 42 and an access opening 44 (FIG. 4) through a periphery of the sleeve portion 30. The observation opening 42 enables the user to observe the tool element 34 of the motor unit 24 relative to the base member 26 and the work surface when the motor unit 24 is inserted into the base assembly 22. The access opening 44 provides additional access to an inner region of the base assembly 22. The access opening 44 is spaced from the observation opening 42 about the periphery of the sleeve portion 30.

The base assembly 22 further includes a door 46 that is disposed on the periphery of the sleeve portion 30 of the base member 26. The door 46 is selectively moveable to cover the access opening 44 in a first position and at least partially expose the access opening 44 in a second position. In the illustrated embodiment, the door 46 is attached to the base member 26 at a hinge 48. With specific reference to FIGS. 4 and 5, the hinge 48 is formed by a cylindrical pin 50 secured to the base member 26. The pin 50 extends parallel to the vertical axis 33 (FIG. 3) and is disposed in one or more recesses formed in the base member 26. The door 46 has at least one hinge portion 52 with at least one vertically-oriented thru-hole (not shown) configured to accept the pin 50 and collectively form a pivot axis at the hinge 48 for rotation of the door 46 about the pin 50. In the illustrated embodiment, the door 46 has an upper hinge portion 53 and a lower hinge portion 55 spaced from the upper hinge portion 53. The door 46 in other embodiments is configured to cooperate with the base member 26 and selectively cover the access opening 46 in any known manner.

Figure 4:
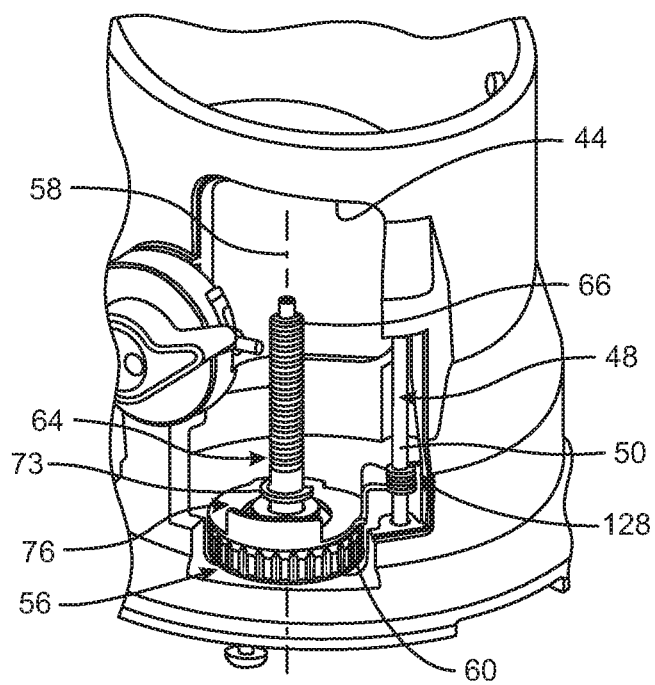
FIG. 4 illustrates the base assembly of FIG. 3 with a door of the base assembly omitted to show an adjustment mechanism and a lock member of the base assembly.

As shown in FIGS. 1-8, the base assembly 22 further includes an adjustment mechanism 56 configured to adjust a position of the motor housing 32 relative to the base member 26 via rotation of the adjustment mechanism about a rotation axis 58 (FIG. 4). The adjustment mechanism 56 includes a first contact portion 60 configured to be actuated by the user to rotate the adjustment mechanism 56 about the rotation axis 58. The user actuates the first contact portion 60 by contacting a peripheral surface 62 of the first contact portion 60 with one or more fingers or digits of the user and then applying a force to the first contact portion 60 to rotate the adjustment mechanism 56. In the illustrated embodiment, the first contact portion 60 has a cylindrical geometry, such as a dial, with a continuous peripheral surface disposed concentrically about the rotation axis 58. The first contact portion 60 in other embodiments can have different geometries, and the peripheral surfaces associated with these other embodiments can vary with respect to their continuity about and radial distance from the rotation axis 58.

The adjustment mechanism 56 further includes an adjusting portion 64 that extends concentrically along the rotation axis 58 from the first contact portion 60. The adjusting portion 64 is configured to cooperate with the motor housing 32 to adjust the position of the motor housing 32 relative to the base member 26 when the adjustment mechanism 56 is rotated by the user. In the embodiment shown, the adjusting portion 64 has external threads 66 that engage complimentary internal threads 68 formed in a recess 70 in the outer surface 38 of the motor housing 32. When the external threads 66 of the adjusting portion 64 are engaged with the internal threads 68 in the motor housing 32, the adjusting portion 64 converts the rotational motion of the adjustment mechanism 56 to a linear motion to adjust the position the motor unit 24 relative to the base member 26. The adjustment mechanism 56 and the motor unit 24 in other embodiments can use different elements and configurations to convert the rotational motion of the adjustment mechanism 56 to a linear motion to adjust the position of the motor unit 24.

Figure 5:
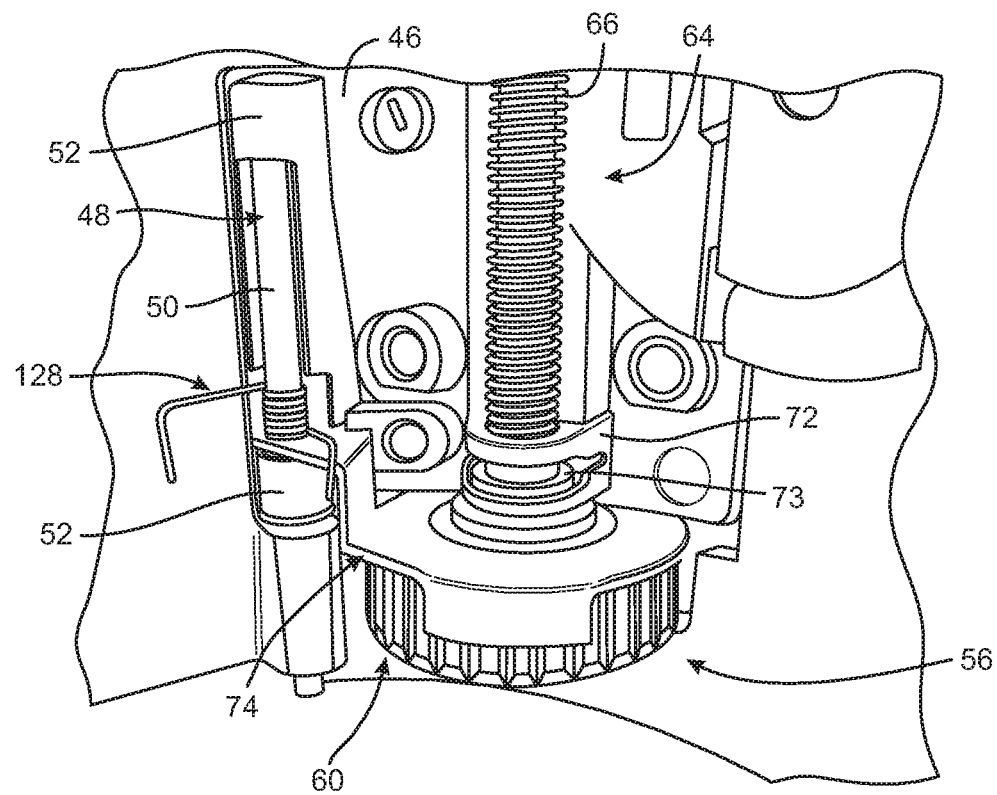
FIG. 5 depicts an enlarged view of an inner region of the base assembly of FIG. 3 showing the adjustment mechanism and the lock member of FIG. 4 arranged relative to the door.
Figure 6:
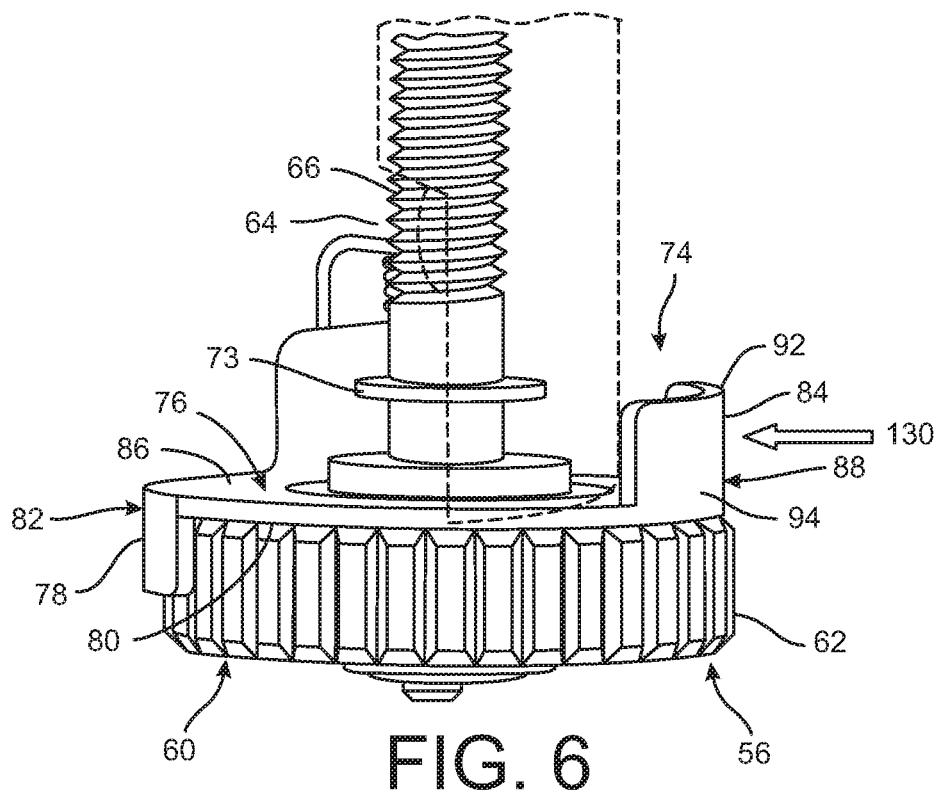
FIG. 6 illustrates a side perspective view of the adjustment mechanism and the lock member of FIG. 4 with a base member of the base assembly omitted and the door shown transparently.
Figure 7:
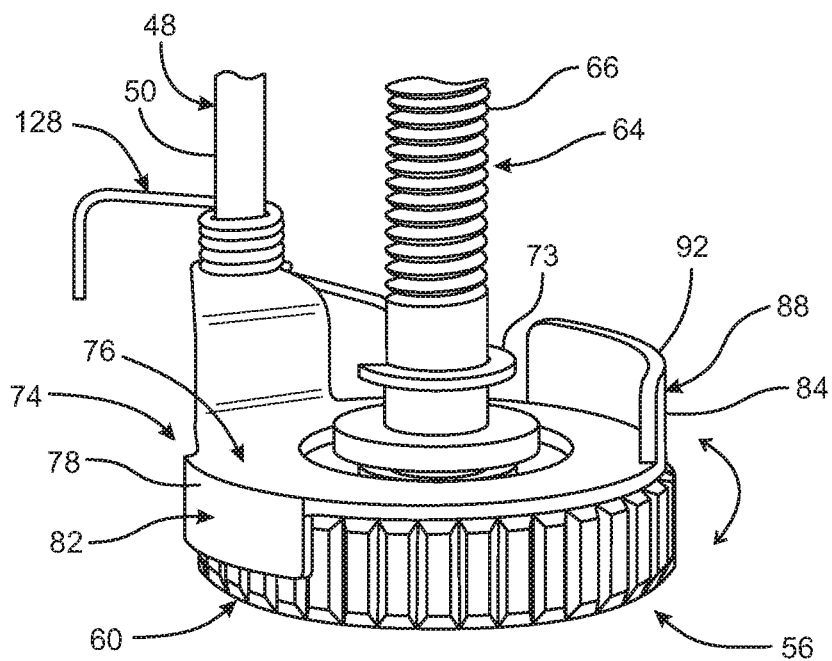
FIG. 7 depicts a side perspective view of the adjustment mechanism and the lock member of FIG. 6 without the base member or the door shown.
Figure 8:
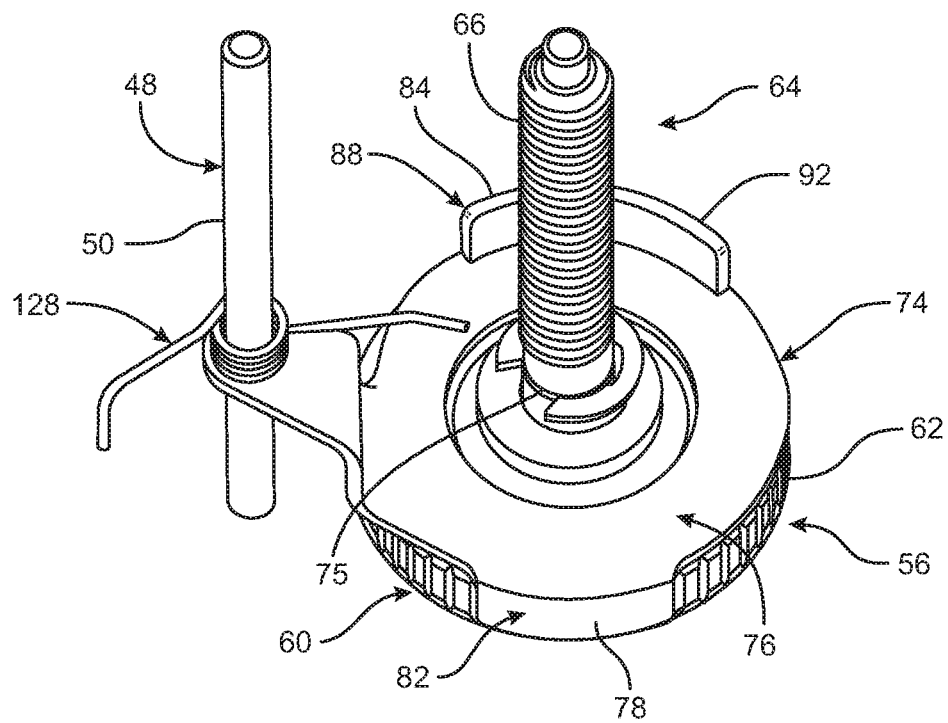
FIG. 8 illustrates a top perspective view of the adjustment mechanism and the lock member of FIG. 7.

As shown in FIG. 5, the adjustment mechanism 56 in the illustrated embodiment is coupled to the door 46 by one or more flanges 72 extending inwardly from the door 46. The adjustment mechanism 56 is coupled to the door 46 in a manner that allows the adjustment mechanism 56 to freely rotate about the rotation axis 58, but prevents vertical translation of the adjustment mechanism 56 relative to the door 46 and the base member 26. In some embodiments, an e-clip 73 (FIGS. 4-8) engages a corresponding annular groove 75 (FIG. 8) in the adjustment portion 64 to fix the vertical position of the adjustment mechanism 56.

With reference again to FIGS. 1-8, the base assembly 22 further includes a lock member 74 that cooperates with the adjustment mechanism 56 to prevent or allow rotation of the adjustment mechanism 56 depending on a position of the lock member 74 relative to the adjustment mechanism 56. In the illustrated embodiment, the lock member 74 is moveable relative to the adjustment mechanism 56 between a first position that prevents rotation of the adjustment mechanism and a second position that permits rotation of the adjustment mechanism.

The lock member 74 has a body portion 76 that is planar and is oriented generally perpendicular to the rotation axis 58 of the adjustment mechanism 56. The body portion in other embodiments can have non-planar portions. The lock member 74 has a first tab 78 that extends from a first side 80 (FIG. 6) of the body portion 76 to form a locking portion 82. The lock member also has a second tab 84 that extends from a second side 86 (FIG. 6) of the body portion 76 to form a second contact portion 88. The second contact portion 88 is configured to be actuated by the user to position the lock member 74 in the second position and allow rotation of the adjustment mechanism 56 upon actuation of the first contact portion 60.

With reference to FIGS. 1-4 and 6, the second tab 84 positions the second contact portion 88 proximate to the first contact portion 60 of the adjustment mechanism 56 such that the first contact portion 60 and the second contact portion 88 are simultaneously actuable with a single finger or digit of the user. The first contact portion 60 has a first contour 90 (FIG. 14) defined by the peripheral surface 62, and the second contact portion 88 has second contour 92 defined by an outer surface 94 (FIG. 6) of the second tab 84. In the illustrated embodiment, the second contour 92 has a shape that is approximately identical to a shape of the portion of the first contour 90 actuable by the finger or digit of the user when the first and second contours are projected onto a reference plane oriented normal to the rotation axis 58. The shape of the second contour 92 compliments the sweeping motion of the finger or digit of the user during rotation of the adjustment member.

Figure 16:
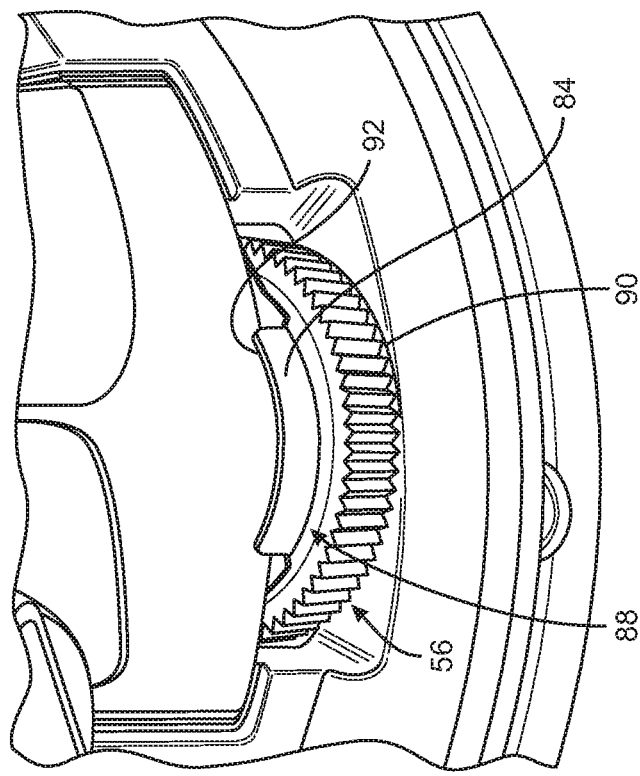
FIG. 16 illustrates an enlarged side perspective view of a base assembly with a lock member having a contact portion with a contour similar to a contour of a contact portion of the adjustment member.

In embodiments in which the shapes of the first and second contours are approximately the same, the second contour 92 can have a radial positioning that is different than a radial positioning of the first contour 90 with respect to the rotation axis 58. In some embodiments, such as the embodiment shown in FIG. 6, the first and second contours have approximately the same shape and the second contour 92 is approximately radially aligned with the first contour when viewed on the reference plane. In other embodiments, such as the embodiment shown in FIG. 16, the first and second contours have approximately the same shape, but the second contour 92 is disposed radially inwardly from the first contour 90 when viewed on the reference plane. In yet other embodiments, the first and second contours have approximately the same shape, but the second contour is disposed radially outwardly from the first contour when viewed on the reference plane.

Figure 17:
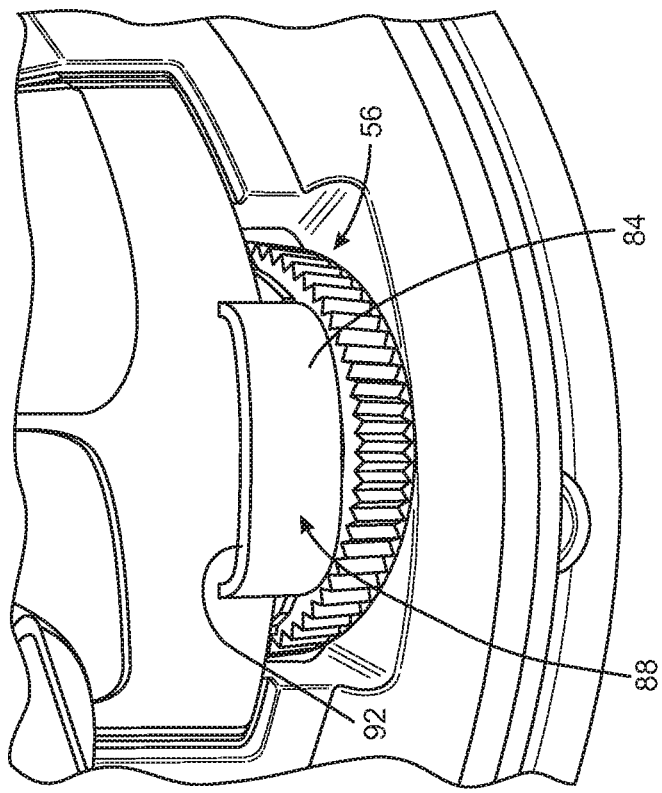
FIG. 17 illustrates the base assembly of FIG. 16 with a lock member having a contact portion with a contour that is different than the contour of the contact portion of the adjustment member.

In yet further embodiments, such as the embodiment depicted in FIG. 17, the shape of the second contour 92 is different than the shape of the portion of the first contour 90 actuable by the finger or digit of the user when the first and second contours are projected onto the reference plane. In embodiments in which the shapes of the first and second contours are different, the second contour 92 can have portions with a radial positioning that is different than a radial positioning of the first contour 90 with respect to the rotation axis. In some embodiments, the first and second contours have different shapes and all portions of the second contour 92 are disposed radially inwardly from the first contour 90 when viewed on the reference plan. In other embodiments, the first and second contours have different shapes and all portions of the second contour 92 are disposed radially outwardly from the first contour 90 when viewed on the reference plane. In yet further embodiments, such as the embodiment depicted in FIG. 17, the first and second contours have different shapes and some portions of the second contour 92 are disposed radially inwardly from the first contour 90 while other portions of the second contour 92 are disposed radially outwardly from the first contour 90 when viewed on the reference plane. In all embodiments of the adjustment mechanism and the lock member discussed above, the first and second contours may have different or additional contours when projected onto different reference planes not explicitly identified above.

The lock member 74 is further described with reference to FIGS. 4-14. FIGS. 9-14 depict embodiments of the lock member that differ in some respects to the lock member illustrated in FIGS. 1-8. To differentiate features of the alternative the lock member embodiments shown in FIGS. 9-14, similar features are identified with the same reference numbers used in FIGS. 1-8 followed by a subscript letter corresponding to a specific embodiment. New features of the alternative lock member embodiments shown in FIGS. 9-14 are identified with new reference numbers.

In the illustrated embodiments, the locking portion 82 of the lock member 74 prevents rotation of the adjustment mechanism 56 by contact between the locking portion 82 and a portion of the first contact portion 60 when the lock member 74 is in the first position. In the second position of the lock member 74, the locking portion 82 is spaced from the first contact portion 60 so as to allow rotation of the adjustment mechanism 56 by the user. The contact between the locking portion 82 and the first contact portion 60 can be carried out in different ways. In some embodiments, a region of the first tab 78 facing the first contact portion 60 includes a deformable pad configured to at least partially deform on the peripheral surface 62 of the first contact portion 60 when the lock member 74 is in the first position. In other embodiments, the region of the first tab 78 facing the first contact portion 60 includes a friction material or a friction surface configured to generate a frictional force on the peripheral surface 62 that opposes a rotation of the adjustment mechanism 56 when the lock member 74 is in the first position. In yet further embodiments, such as those depicted in FIGS. 9-14, the locking portion 82 includes a lock feature or key 102 that cooperates with the peripheral surface 62 to prevent rotation of the adjustment mechanism 56.

Figure 14:
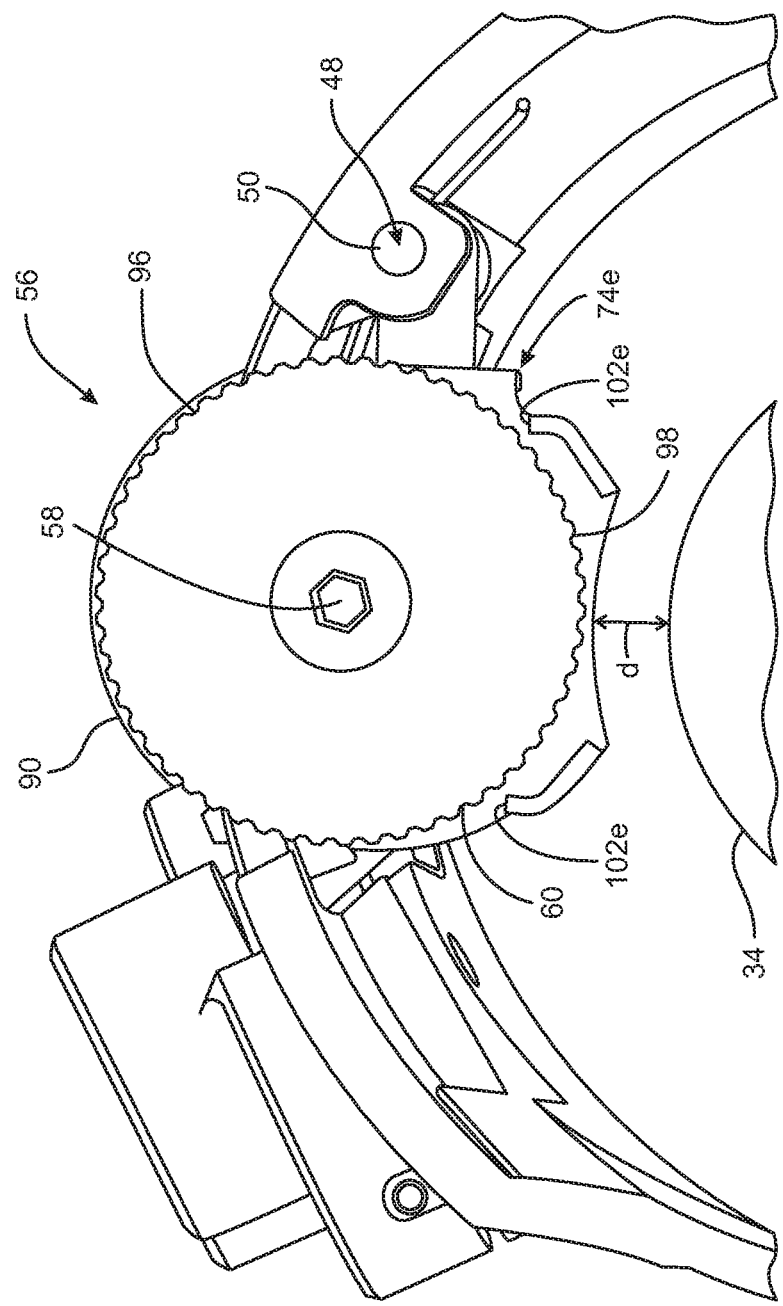
FIG. 14 depicts a bottom plan view of the lock member of FIG. 13 relative to the adjustment mechanism and a tool of the router.
Figure 15:
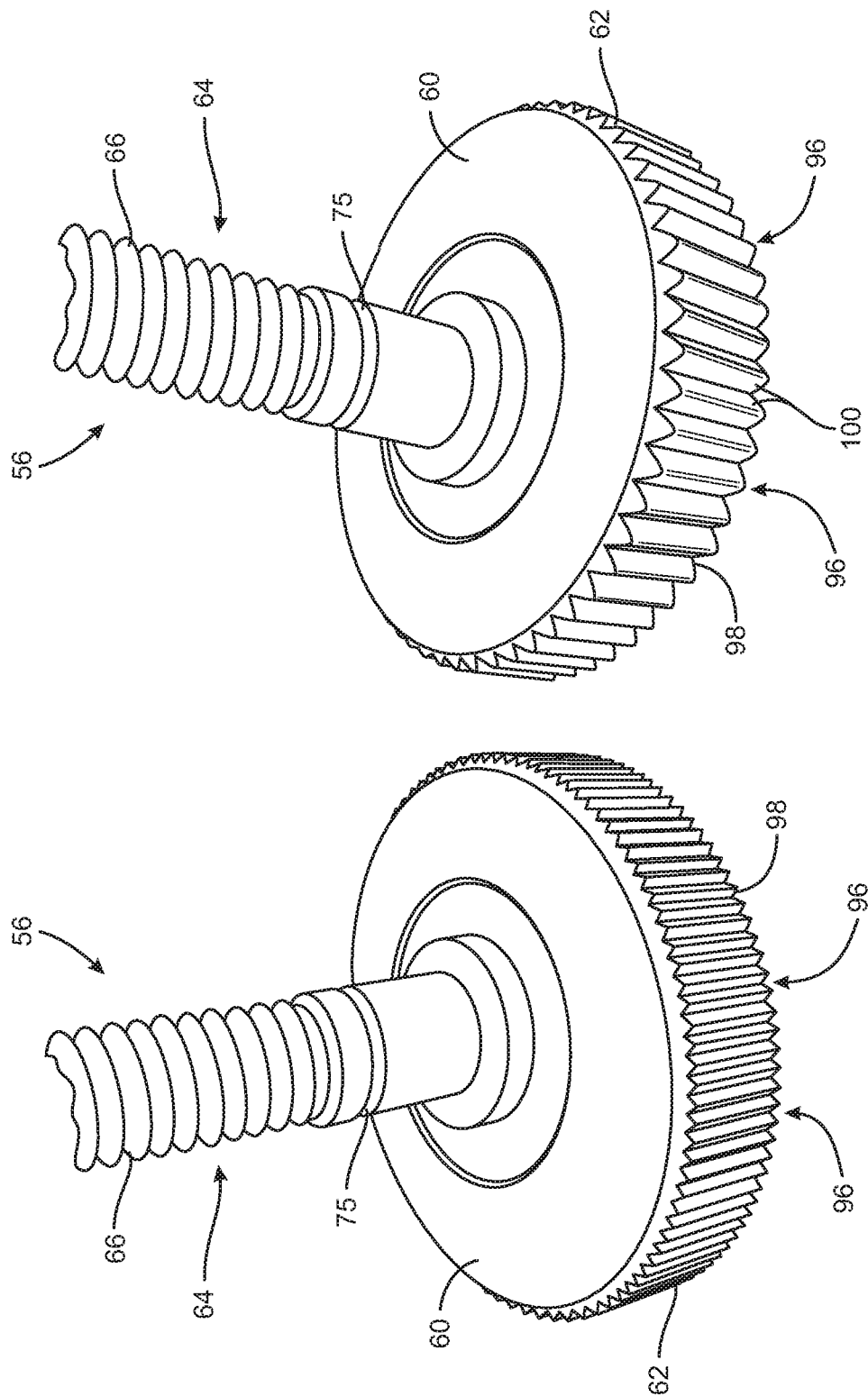
FIG. 15 illustrates two adjustment mechanisms each having a circumferential surface with a geometric pattern.

As best shown in FIGS. 14 and 15, the peripheral surface 62 of the first contact portion 60 is a cylindrical circumferential surface that includes a geometric pattern 96. The geometric pattern is a repeating geometric pattern 96 that encircles the entire circumference of the first contact portion 60 of the adjustment mechanism 56. Alternatively, the geometric pattern can be disposed on less than the entire circumference of the first contact portion. In the illustrated embodiment, the geometric pattern 96 includes a series of vertically-oriented straight grooves 98 disposed around the circumference of the first contact portion 60.

The grooves 98 are triangular-shaped as is best shown in FIG. 14 although other shapes are possible in other embodiments. The grooves 98 each have two sides 100 that open outwardly at an angle. In some embodiments, the sides 100 open outwardly at an angle of 45 degrees such that the angle between the sides of each groove 98 is 90 degrees. In other embodiments, the sides 100 open outwardly at angle greater or lesser than 45 degrees such that the angle between the sides of each groove 98 is greater or lesser than 90 degrees. The sides 100 of each groove form respective groove faces that cooperate with the lock portion 82 to prevent rotation of the adjustment mechanism 56

With reference again to FIGS. 9-14, the key 102 of the locking portion 82 engages at least one position in the geometric pattern 96 when the lock member 74 is in the first position. As shown in the embodiments of FIGS. 9-11, the key 102 protrudes from an inner surface 104 of the first tab 78 facing the geometric pattern 96. The key 102 can be disposed at any position on the inner surface 104 as illustrated in FIGS. 9-11.

As shown in the embodiments of FIGS. 12 and 13, the locking portion 82 has two keys 102 with each key 102 formed by a vertical edge 106 along a circumferential end 108 of the first tab 78. The keys 102 in the embodiments of FIGS. 12 and 13 engage at least two positions in the geometric pattern 96 when the lock member 74 is in the first position. In the embodiment of FIG. 12, the first tab 78 is continuous and the keys 102 are formed along the circumferential ends 108 of the continuous first tab 78. The circumferential ends 108 in this embodiment have a radially inward deviation from a contour of the first tab 78 that optimizes the position and orientation of the keys 102 with respect their engagement with the geometric pattern 96.

In the embodiment of FIG. 13, one key 102 is formed by a vertical edge along an outer circumferential end 110 of a first locking tab 112 that extends from the body portion 76, and the other key 102 is formed by a vertical edge along an outer circumferential end 110 of a second locking tab 118 that extends from the body portion 76. In this embodiment, the first locking tab 112 forms a first locking portion 116 and the second locking tab 114 forms a second locking portion 118. The second locking tab 114 is spaced from the first locking tab 112 about a periphery of the lock member 74. The outer circumferential ends 110 in the embodiment of FIG. 13 each have a radially inward deviation similar to circumferential ends of FIG. 12.

The keys 102 in the illustrated embodiments each have a shape that compliments the shape of the geometric pattern 96 so as to ensure reliable engagement between the key 102 and the geometric pattern 96. As shown in the embodiments of FIGS. 9-11, the protrusion that forms the key 102 on the inner surface 104 of the first tab 78 is triangle-shaped so as to correspond to the triangle-shaped groove 98 (FIGS. 14 and 15) of the geometric pattern 96. As shown in FIG. 14, which depicts the lock member 74 of FIG. 13, the position and orientation of the vertical edges 106 of the first locking tab 112 and the second locking tab 114 forms a triangle-shaped engagement portion that engages the triangle-shaped grooves 98 of the geometric pattern 96. In a preferred embodiment, the keys 102 each have at least one face that is oriented perpendicular to a line of force/action from contact between the face of the key and a respective side of the groove 98 of the geometric pattern 96.

The grooves 98 of the geometric pattern 96 in some embodiments are smaller or larger than the grooves 98 in other embodiments. For example, the grooves 98 depicted in FIG. 15—Left are smaller than the grooves 98 depicted in FIG. 15—Right. The use of smaller grooves allows for a greater number of total grooves (and engagement points) around the first contact portion, while the use of larger grooves such as those in FIG. 15—Right allows for a lesser number of total grooves (and engagement points) around the first contact portion for similarly-sized adjustment mechanisms 56.

As shown in FIGS. 4, 5, and 9-14, the lock member 74 further includes an attachment portion 120 that extends laterally outwardly from the body portion 76. The attachment portion 120 defines an attachment opening 122 that accepts the pin 50 secured to the base member 26 and moveably attaches the lock member 74 to the base member 26. The attachment opening 122 is circular in some embodiments (FIGS. 9-11 and 13). Alternatively, the attachment opening 122 can be formed as an oval slot (FIG. 12). The attachment portion 120 in some embodiments, such as the embodiment of FIG. 9, is planar and extends laterally along the same plane as the body portion 76. The attachment portion 120 in other embodiments, such as the embodiments of FIGS. 4, 5, and 10-14, includes an offset portion 124 that connects the attachment portion 120 to the body portion 76 at a position vertically offset from the body portion 76. In the illustrated embodiments, the lock member 74 is fixed vertically relative to the base member 26 and the door 46 by cooperation between a bottom surface 126 of the attachment portion 120 and an upper surface portion of the lower hinge portion 55 (FIG. 5). Alternatively, the vertical position of the lock member 74 can be fixed in any known manner.

The cooperation between the attachment opening 122 and the pin 50 allows the lock member 74 to rotate about the pivot axis at the hinge 48. The base assembly 22 further includes a resilient member 128 that applies a biasing force to the lock member 74 to normally maintain the lock member 74 in the first position shown in FIGS. 1-8. In the illustrated embodiment, the resilient member is a torsion spring with a coil body and two laterally extending spring legs. The spring is attached to the base assembly 22 such that the pin 50 passes through an opening defined by the coil body of the spring. One spring leg is biased against the inner surface 40 of the base member 26. The other spring leg is biased against one or both of the attachment portion 120 and the offset portion 124 of the lock member 74. Alternatively, the spring 128 can be attached to the base assembly 22 in different ways, and the spring legs can cooperate with the lock member 74 at different portions of the lock member 74.

With reference to FIGS. 4-6 and 14, the first position of the lock member 74 is set by the contact between the locking portion 82 of the lock member 74 and the peripheral surface 62 of the adjustment mechanism 56. In the illustrated embodiments, the biasing force on the lock member 74 from the resilient member 128 pushes the key 102 of the lock member 74 into engagement with at least one of the grooves 98 of the adjustment mechanism 56. The key 102, once engaged in the groove 98, sets the rotational position of the lock member 74 relative to the adjustment mechanism 56.

The lock member 74 is moved to the second position by applying an actuation force to the second contact portion 88 of the lock member 74 in the general direction of arrow 130 (FIG. 6) that is greater than the biasing force of the resilient member 128 on the lock member 74. The actuation force rotates the lock member 74 into the second position shown in FIG. 14 in which the key 102 is disengaged and spaced from the grooves 98. As shown in FIGS. 1-3, 6, 16, and 17, the second position of the lock member 74 is set by contact between the second tab 84 of the lock member 74 and an outer surface of the door 46 when the second contact portion 88 is actuated by the user. One or both of the second tab 84 and the door are configurable to set a desired rotational travel of the lock member 74 relative to the adjustment mechanism 56.

With reference to FIGS. 6-13, the lock member 74 is arranged such that body portion 76 is disposed vertically above and adjacent to an upper surface of the first contact portion 60 of the adjustment mechanism 56. In the illustrated embodiments, the body portion 76 defines a central opening 132 that extends through the body portion 76, and the adjusting portion 64 of the adjustment mechanism 56 extends through the central opening 132. The central opening 132 is sized to provide clearance between the lock member 74 and the adjusting portion 64 in the first position and the second position of the lock member 74. With reference to FIGS. 13 and 14, the lock member 74 in some embodiments has a clearance profile 134 disposed along a portion of the periphery of the lock member 74. In the illustrated embodiment, the clearance profile 134 is disposed on a periphery of the body portion 76 between the first locking tab 112 and the second locking tab 114. The clearance profile provides a predetermined clearance (d) between the lock member 74 and the tool element 34.

As shown in FIGS. 1-5, the base assembly 22 further includes a knob mechanism 136 attached to the base member 26. The knob mechanism 136 is operable to cooperate with the door 46 and the adjusting portion 64 of the adjustment mechanism 56 depending on a position of the knob mechanism 136. In the illustrated embodiment, the knob mechanism 136 is positionable in a first position that allows "course adjustment" of the position of the motor unit 24, a second position that allows "fine adjustment" of the position of the motor unit, and a third position that contributes to fixing the position of the motor unit 24. The knob mechanism 136 is positionable in 40 degree increments among the first, second, and third positions, although in other embodiments the angular increments can be greater or lesser than 40 degrees.

In the first position 138 of the knob mechanism 136, a resistance pin 144 (FIG. 4) is maintained in spaced relation to the external threads 66 of the adjusting portion 64 of the adjustment mechanism 56. The knob mechanism 136 has a ramped profile (not shown) that cooperates with the outer surface of the door 46 to allow positioning of the door in its first and second positions depending on the position of the knob mechanism 136. The biasing force of the resilient member 128 on the lock member 74 presses the lock member 74 into the adjustment mechanism 56, which in turn presses the adjustment mechanism 56 into the door 46. When the knob mechanism 136 is in the first position, the ramped profile allows the door 46 to rotate outwardly about the hinge 48. As the door 46 rotates outwardly, the adjustment mechanism 56 and the lock member 74 move together with the door without relative movement relative to the door 46.

The cooperation of the ramped profile of the knob mechanism 136 and the outer surface of the door 46 when the knob mechanism is in the first position 138 sets the second position of the door. In the second position of the door 46, the external threads 66 of the adjustment mechanism 56 are moved out of engagement with the internal threads 68 of the motor housing 32. In this arrangement, the motor unit is freely vertically positionable relative to the base assembly by the user.

In the second position of the knob mechanism 136, the resistance pin 144 is pressed into the external threads 66 of the adjusting portion 64 with a first force to generate a first rotational resistance to the rotation of the adjustment mechanism 56. The ramped profile in the second position 140 of the knob mechanism 136 positions the door 46 in its first position such that door covers the access opening and such that the external threads 66 of the adjustment mechanism 56 are moved into engagement with the internal threads 68 of the motor housing 32. In the second position 140 of the knob mechanism 136, the adjustment mechanism 56 is rotatable by the user when the lock member 74 is actuated to its second position.

In the third position of the knob mechanism 136, the resistance pin 144 is pressed into the external threads 66 of the adjusting portion 64 with second force to generate a second rotational resistance to the rotation of the adjustment mechanism 56. The second force and the second rotational resistance are greater than the first force and the first rotational resistance such that the adjustment mechanism 56 is generally not rotatable by the user even if the lock member 74 is actuated to its second position.

Figure 18:
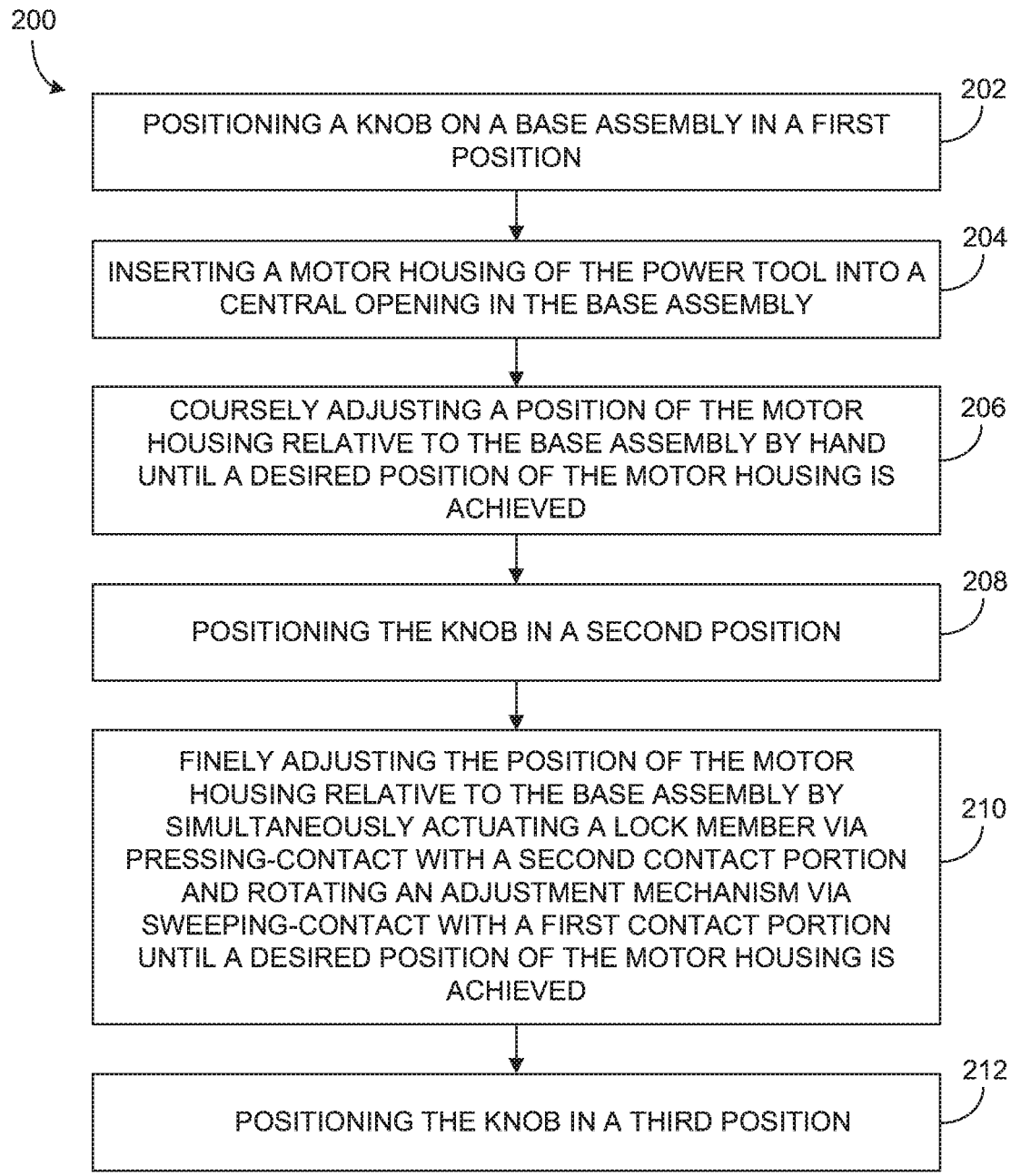
FIG. 18 illustrates a method for adjusting a position of the router of FIG. 1.

A method 200 for adjusting a position of the router 20 is shown in FIG. 18 and described with reference to FIGS. 1 and 2. The user positions the knob mechanism 136 on the base assembly 22 in the first position 138 (block 202). The motor housing 32 of the motor unit 24 is then inserted into the central opening 31 of the base member 26 (block 204) with attention to the alignment of the recess 70 of the motor housing 32 with respect to the adjusting portion 64 of the adjustment mechanism 56. The user then makes a course adjustment of the vertical position of the motor unit 24 relative to the base member 26 by manually grasping the motor unit with his or her hand and moving it vertically relative to the base member 26 (block 206).

When a desired position is achieved using the course adjustment, the user then positions the knob mechanism 136 in the second position 140 (block 208). The user makes a fine adjustment of the vertical position of the motor unit 24 relative to the base member 26 by actuating the second contact portion 88 of the lock member 74 and the first contact portion 60 of the adjustment mechanism 56 simultaneously (block 210). The first contact portion 60 and the second contact portion 88 are actuatable by the same finger or digit of the user due to their proximity and geometry with respect to one another. The user actuates the second contact portion by pressing his or her finger against the second contact portion 88 to move the lock member 74 from its first position to its second position. The user actuates the first contact portion 60 by pressing his or her finger against the first contact portion 60 and sweeping the finger in the desired direction of rotation of the adjustment mechanism 56 to move the motor unit 24 vertically upward or vertically downward relative to the base member 46.

When a desired position is achieved using the fine adjustment, the user releases his finger from the second contact portion 88 and the first contact portion, and then turns the knob mechanism 136 to the third position 142 (block 212). The router 20 is then ready for operation by the user.

The lock member is an unobtrusive, user-actuated feature that does not require an additional user action to transition from lock (adjustment mechanism rotation stopped) to unlock (adjustment mechanism rotation allowed). The lock member is normally-closed (locked) and prevents possibility of unwanted rotation of the adjustment mechanism from accidental contact or vibration. The adjustment mechanism is only unlocked when a user's finger contacts the adjustment mechanism and simultaneously pushes the second contact portion of the lock member. The adjustment mechanism and lock member are placed in close proximity so that the user's finger will always contact both interfaces. The position of the second contact portion can be biased so that the user's finger always encounters the surface of the second contact portion surface before the adjustment mechanism can be rotated.

The locking portion of the lock member can be configured in such a way as to shield cutting debris from the first contact portion of the adjustment mechanism, ensuring that debris has minimal effect on the locking geometry. The lock member is spring loaded to provide a normally locked adjustment mechanism. The preferred embodiment applies a reduced spring load to the lock member relative to the force that the user needs to rotate the adjustment mechanism. In the preferred embodiment, a single spring serves dual purpose of (1) opening the door (element which supports threaded adjustment screw) and (2) pushing the lock member into the first (or the "lock") position.

The shape of the second contact portion is curved such that it does not interfere with usage of the adjustment mechanism. The shape of the second contact portion compliments the user's finger motion for rotating the adjustment mechanism. The circumference of the adjustment mechanism interface contains a geometric pattern that engages a detent key on the lock member. The spring force applied to the lock member causes the detent to engage and maintain the rotational position of the adjustment mechanism. The preferred embodiment of the geometric pattern in the adjustment mechanism uses straight grooves that allow it to engage a straight detent.

A deformable pad (such as rubber) could be used to hold the adjustment mechanism in the fixed position. A frictional contact friction could also be used to hold the adjustment mechanism in the fixed position. The locking pattern can be placed on the cylindrical ends of the adjustment mechanism instead of its peripheral surface. Placement of the pattern on the outside diameter can simplify manufacturing and reduce manufacturing costs. The preferred configuration of the lock member would use one locking detent although two or more could be used.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected. For instance, in some alternative embodiments, the lock member is moveable relative to the adjustment member via translation along a linear path and/or translation along a curvilinear path. In these alternative embodiments, the linear path and/or the curvilinear path could be defined by any one or more of the base member, the door, the adjustment mechanism, and the lock member.

What is claimed is:

1. A base assembly for a power tool, comprising:
    a base member configured to accept a motor housing of the power tool;
    an adjustment mechanism attached to the base member and configured to adjust a position of the motor housing relative to the base member; and
    a lock member attached to the base member, the lock member moveable relative to the adjustment mechanism between a first position that prevents rotation of the adjustment mechanism and a second position that permits rotation of the adjustment mechanism,
    wherein the adjustment mechanism includes a first contact portion and a shaft portion extending axially from the first contact portion, the first contact portion configured to be actuated to rotate the adjustment mechanism,
    wherein the lock member includes a second contact portion positioned proximate to the first contact portion and configured to be actuated to position the lock member in the second position, the position of the motor housing adjusted by simultaneous actuation of the first contact portion and the second contact portion by a user, and
    wherein the lock member has a locking portion that prevents rotation of the adjustment mechanism by contact between the locking portion and a portion of the first contact portion when the lock member is in the first position.

2. The base assembly of claim 1, wherein the locking portion is spaced from the first contact portion when the lock member is in the second position.

3. The base assembly of claim 1, wherein the first contact portion defines a peripheral surface of the adjustment mechanism and wherein the locking portion is configured to engage a geometric pattern in the peripheral surface.

4. The base assembly of claim 3, wherein the locking portion is further configured to engage the geometric pattern at a plurality of positions spaced about the peripheral surface.

5. The base assembly of claim 4, wherein:
    the locking portion includes a first locking portion disposed on a first locking tab extending from the lock member and a second locking portion disposed on a second locking tab extending form the lock member, the second tab spaced from the first tab about a periphery of the lock member, and
    the lock member has a clearance profile between the first and second locking tabs, the clearance profile providing a predetermined clearance to a tool attached to the power tool.

6. The base assembly of claim 3, wherein the geometric pattern includes a plurality of straight grooves and wherein the locking portion includes straight detent that engages in a corresponding one of the straight grooves.

7. The base assembly of claim 1, wherein the first contact portion defines a peripheral surface of the adjustment mechanism and wherein the locking portion includes a deformable pad configured to at least partially deform on the peripheral surface.

8. The base assembly of claim 1, wherein the first contact portion defines a peripheral surface of the adjustment mechanism and wherein the locking portion includes a friction surface configured to generate a frictional force that opposes rotation of the adjustment mechanism.

9. The base assembly of claim 1, further comprising a resilient member configured to bias the lock member in the first position.

10. The base assembly of claim 1, wherein the adjustment mechanism is rotatable about a rotation axis passing through the adjustment mechanism and concentric with the first contact portion and wherein the lock member is movable via rotation about a pivot axis spaced from and parallel to the rotation axis.

11. The base assembly of claim 1, wherein the lock member is moveable via translation along a linear path or a curvilinear path.

12. The base assembly of claim 1, wherein the adjustment mechanism is rotatable about a rotation axis passing through the adjustment mechanism and concentric with the first contact portion and wherein the lock member has a planar body portion disposed perpendicular to the rotation axis of the adjustment mechanism.

13. The base assembly of claim 12, wherein the locking portion is disposed on a first tab extending from a first side of the planar body portion and wherein the second contact portion is disposed on a second tab extending from a second side of the planar body portion in a direction opposite the extension of the first tab.

14. The base assembly of claim 13, wherein:
the first contact portion has a first contour,
the second contact portion has a second contour defined by the second tab, and
the second contour is aligned with the portion of the first contour configured to be actuated by the user when viewed in a plane normal to the rotation axis and when the lock member is in the first position.

15. The base assembly of claim 13, wherein:
the first contact portion has a first contour,
the second contact portion has a second contour defined by the second tab, and
the second contour is one of radially inward or radially outward from the portion of the first contour configured to be actuated by the user when viewed in a plane normal to the rotation axis and when the lock member is in the first position.

16. The base assembly of claim 12, wherein:
the shaft portion extending concentrically along the rotation axis, the shaft portion configured to cooperate with the motor housing to adjust the position of the motor housing, and
the planar body portion of the lock member defines a central opening through which the shaft portion extends, the central opening sized so as to provide clearance to the shaft portion in the first and second positions of the lock member.

17. The base assembly of claim 1, wherein the base member has a first opening extending therethrough and defining an axial direction, a portion of the motor housing accepted within the first opening so as to cooperate with the adjustment mechanism.

18. The base assembly of claim 17, further comprising a door positioned on a periphery of the base member, the door moveable to cover a second opening through the periphery of the base member in a first position and partially expose the second opening in a second position,
wherein the adjustment mechanism and the lock member are moveable together with the door without movement relative to the door as the door moves between the first and second positions.

19. The base assembly of claim 1, wherein the first contact portion and the second contact portion are actuated simultaneously by a single digit of the user to adjust the position of the motor housing.

20. A base assembly for a power tool, comprising:
a base member configured to accept a motor housing of the power tool;
an adjustment mechanism attached to the base member and configured to adjust a position of the motor housing relative to the base member; and
a lock member attached to the base member, the lock member moveable relative to the adjustment mechanism between a first position that prevents rotation of the adjustment mechanism and a second position that permits rotation of the adjustment mechanism,
wherein the adjustment mechanism includes a first contact portion configured to be actuated to rotate the adjustment mechanism,
wherein the lock member includes a second contact portion positioned proximate to the first contact portion and configured to be actuated to position the lock member in the second position, and
wherein the position of the motor housing is adjusted by simultaneous actuation of the first contact portion and the second contact portion via a single digit of a user such that (i) the lock member is configured to be held in the second position by the single digit and (ii) the adjustment mechanism is configured to be rotated by the single digit.

* * * * *